United States Patent [19]

Si et al.

[11] Patent Number: 5,539,577
[45] Date of Patent: Jul. 23, 1996

[54] MEANS TO LESSEN UNWANTED REFLECTIONS IN AN OPTICAL DEVICE

[75] Inventors: Y. Calvin Si; Gary S. Duck, both of Nepean; Yihao Cheng, Kanata, all of Canada

[73] Assignee: JDS Fitel, Inc., Nepean, Canada

[21] Appl. No.: 442,362

[22] Filed: May 16, 1995

[51] Int. Cl.$^6$ ............................. G02B 27/14; G02B 1/10; G02B 6/26; G02B 6/32
[52] U.S. Cl. ............................. 359/629; 385/31; 385/33; 385/34; 385/47; 359/583
[58] Field of Search ............................. 385/31, 33, 34, 385/47; 359/629, 583

[56] References Cited

U.S. PATENT DOCUMENTS

| | | | |
|---|---|---|---|
| 4,550,975 | 11/1985 | Levinson | 385/47 |
| 4,637,682 | 1/1987 | Mahlein | 385/47 |
| 5,082,343 | 1/1992 | Coult | 385/34 |
| 5,402,509 | 5/1995 | Fukushima | 385/33 |

FOREIGN PATENT DOCUMENTS

| | | | |
|---|---|---|---|
| 58-27113 | 2/1983 | Japan | 385/34 |
| 59-111105 | 6/1984 | Japan | 385/34 |
| 1-108509 | 4/1989 | Japan | 385/47 |

OTHER PUBLICATIONS

Stearns et. al., "Angular Division Multiplexer for Fiber Communication Using Graded–Index Rod Lenses" JOURNAL OF LIGHTWAVE TECHNOLOGY, Aug. 1984, pp. 358–362.

Primary Examiner—Georgia Y. Epps
Assistant Examiner—Ricky Mack
Attorney, Agent, or Firm—Neil Teitelbaum & Associates

[57] ABSTRACT

A device for splitting an optical beam into two beams propagating along different optical paths, is provided. The device includes a pair of graded index collimating lenses having their planar collimating ends aligned such that they are both inwardly facing and share a common optical axis. A partially transmitting partially reflective material is disposed between the lenses. At least one of the planar endfaces of the collimating ends are wedge shaped such that a non-zero angle is formed between the two endfaces. This non-zero angle reduces the effect of unwanted optical interference.

8 Claims, 3 Drawing Sheets

Fig. 6
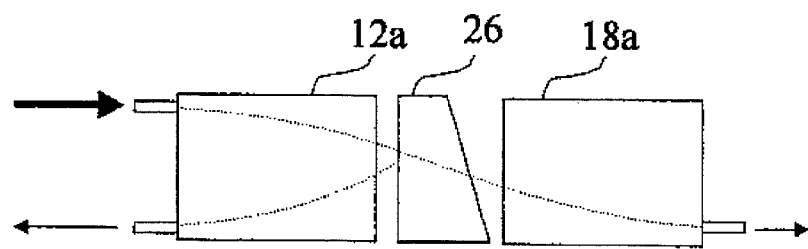
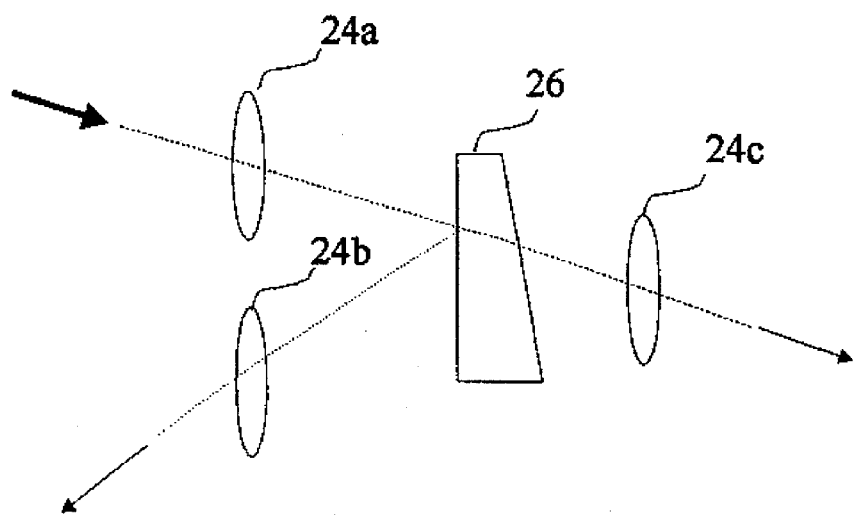
Fig.7
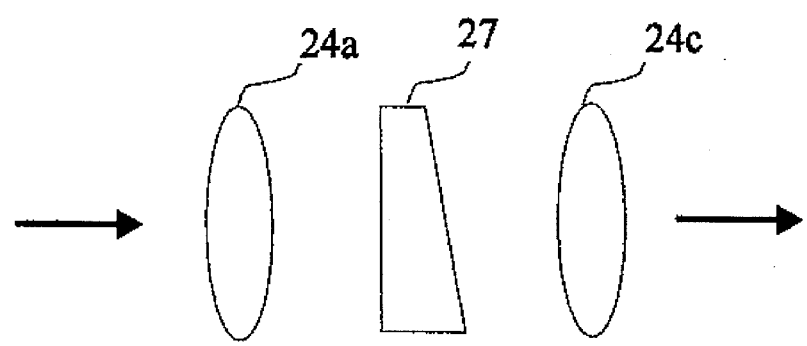
Fig.8

5,539,577

MEANS TO LESSEN UNWANTED REFLECTIONS IN AN OPTICAL DEVICE

FIELD OF THE INVENTION

This invention relates generally to optical coupling technology, and more particularly to an optical coupler that attempts to lessen unwanted multiple reflections within an optical structure.

BACKGROUND OF THE INVENTION

An optical coupler that uses a lens focusing technique typically comprises several separate lens and optical elements, omen in the form of discrete elements or coatings on one or more of the lenses. Conventional systems having back-to-back graded index lenses with parallel inwardly facing endfaces are known to suffer from an etalon effect due to imperfect refractive index matching of adjacent elements resulting in a distorted output signal. By way of example, in a tap coupler, the tapped signal represents a very small portion of transmitted signal energy passing through a coupling device. The ratio of signal energy to tapped energy is typically in the range of 99:1, thus, any small etalon effect in the optical structure may have a significant effect on the tapped signal in a wavelength dependent manner, causing a "wavelength ripple" on the tapped signal.

Although this problem is known to effect digital systems, its consequences are even more significant in analog optical systems where stringent requirements exist for received signals to have minimal distortion or ripple. It is therefore desirable for both wavelength and non-wavelength dependent passive optical components such as couplers and splitters to provide ripple-free output signals. In attempting to achieve this end, it is an object of this invention to overcome some of the limitations in known prior art devices.

Furthermore, it is an object of the invention to provide a coupler that is more tolerant of imperfect refractive index matching between adjacent interfaces within a coupler.

SUMMARY OF THE INVENTION

In accordance with the invention there is provided, an apparatus for splitting an optical beam into at least two beams propagating along different optical paths or for coupling optical beams into a single beam, comprising a first graded index lens having a first and other end, the first end having an input port and a port for receiving a reflected signal; a second graded index lens having an output port end and an other end, the output port end having an output port for receiving light from the input port, the other ends of the first and second lenses being non-parallel surfaces, inwardly facing toward one another; and, an at least partially reflective material coated on one of the other ends of the first and second lenses.

In accordance with the invention, an apparatus for transmitting an optical beam from one port to another is provided, comprising: a first collimating lens having an input end and a collimating output end, the input end having a port for launching the optical beam; a second lens having a focusing end and a collimating end, the focusing end having an port optically aligned to receive the optical beam of light from the input port, the collimating ends of the first and second lenses being non-parallel surfaces, inwardly facing toward one another; and an at least partially transmissive coating disposed on at least one of the collimating ends of the first and second lenses.

In accordance with another aspect of the invention there is provided, an apparatus for transmitting an optical beam from one port to another, comprising: a first lens having a first and other end, the first end having at least an input port; a second lens having an output port end and an other end, the output port end having an output port for receiving light from the input port; a wedge shaped optical element disposed between the first and second lens having at least one inclined face facing at least one of the other ends of the first and second lenses, the inclined face and at least one of the other end faces being non-parallel surfaces.

BRIEF DESCRIPTION OF THE DRAWINGS

Exemplary embodiments of the invention will now be described in conjunction with the following drawings in which:

FIG. 6 is side view of an alternative embodiment of a coupler having a wedge shaped filter interposed between two lenses;

FIG. 7 is a side view of an alternative embodiment of the coupler shown in FIG. 6;

FIG. 8 is an alternative embodiment of the invention shown in FIG. 6 having a single input and a single output port; and, FIG. 9 shown out of order with FIGS. 4a, 4b, and 5 is an alternative embodiment of the invention shown in FIG. 8.

DETAILED DESCRIPTION

Figure 1A:
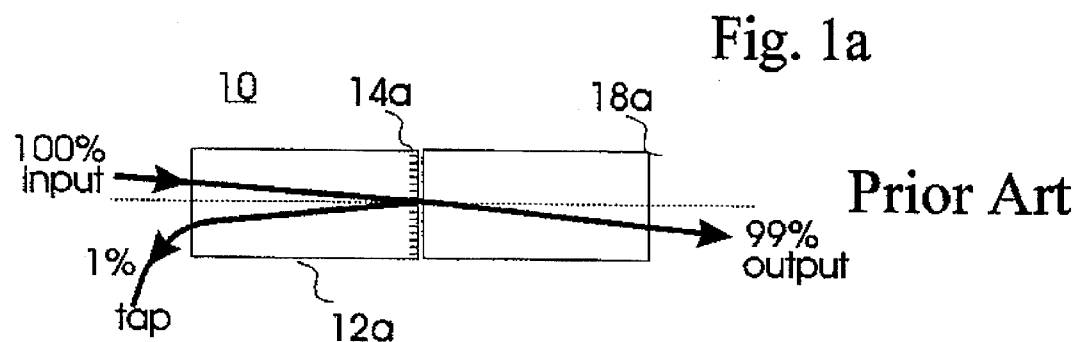
FIG. 1a is a side view of prior art optical coupling device providing a port for tapping a portion of light entering the device.

Turning now, to FIG. 1a, an apparatus for splitting an optical beam, in the form of a coupler 10 is shown. The coupler 10 has a first GRaded INdex (GRIN) collimating lens 12a, having an input port and a 1% tap output port at a first end of the lens. A second GRIN lens 18a preferably having a common optical axis with the first GRIN lens 12a has an output port at a first end, for outputting 99% of an optical beam launched into the input port of the lens 12a. Of course, ratios other than 99:1 can be used. A mostly transmissive, partially reflective material in the form of an coating 14a such as an anti-reflection (AR) coating is applied to an other end of the first lens 12a. The percentage of light that is transmitted through the coupler 10 is dependent upon the characteristics of the applied coating.

Figure 1B:
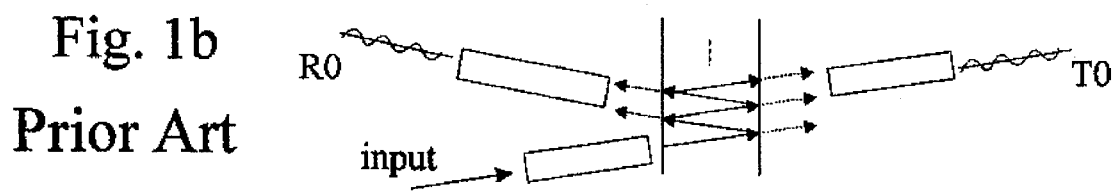
FIG. 1b is a side view of a prior art etalon illustrating an unwanted interference effect.
Figure 4B:
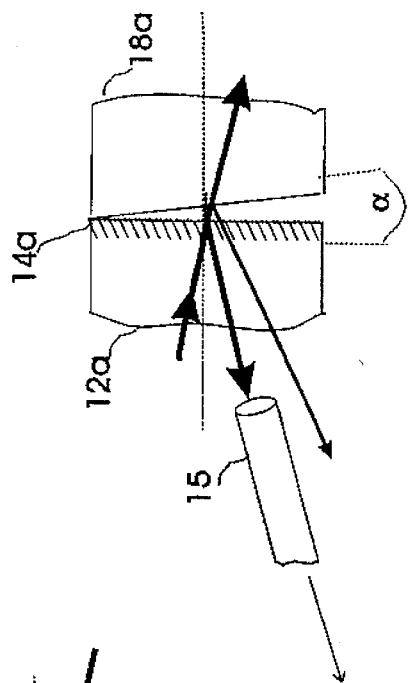
FIG. 4b is a side view illustrating the operation of the devices shown in FIGS. 2 and 3.
Figure 4A:
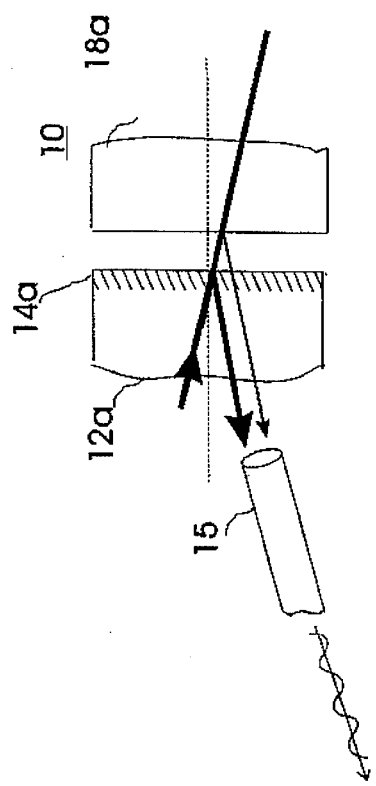
FIG. 4a is a side view of a device as shown in FIG. 1 illustrating the operation of such a device.
Figure 5:
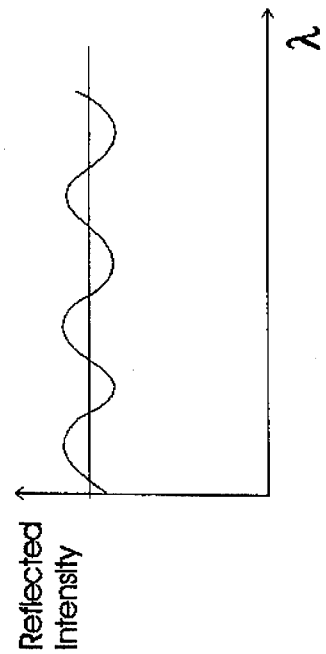
FIG. 5 is a graph illustrating the reflected intensity of two signals combining and interfering in a wavelength dependent manner at a monitoring port on the device shown in FIG. 1.

In operation, a beam of light is launched into the input port of the lens 12a and propagates through the GRIN lens 12a, becoming collimated. The collimation of the beam is not illustrated in the figures. As can be seen, most of the light is transmitted through the lens 12a and the coating 14a and through the second GRIN lens 18a to the output port where 99% of the light exits. Assuming that there is no loss in the coupler, at least 1% of the light entering the input port of lens 12a is reflected back to the tap output port. The problems associated with the lens shown in FIG. 1a are more clearly illustrated by viewing FIGS. 1b and 4a. In FIG. 1b, a Fabry Perot etalon 8 is shown having parallel partially reflective partially transmissive surfaces. Through an unwanted interference effect, the output reflection signal R0 and transmission signal T0 are distorted having an unwanted periodic ripple. As is shown in FIG. 4a, due to very slight differences in the refractive indexes between the coated surface 14a, the air-gap between 14a and 18a, and the GRIN lens 18a, a cavity is formed. The collimating end of the GRIN lens 18a and the coated surface 14a form an etalon. Due to presence of multiple reflections inside the etalon, unwanted beams of light are reflected toward the 1% tap port in parallel with the tap signal; the overall result is the interference of the unwanted, signal with the desired 1% tap signal along the reflection path. Since the magnitudes of the 1% tap signal and the unwanted signal are comparable, the intensity of the combining interfering beams of light are significantly wavelength dependent. The overall effect is distortion in the form of a wavelength ripple present on the tap signal.

Figure 2:
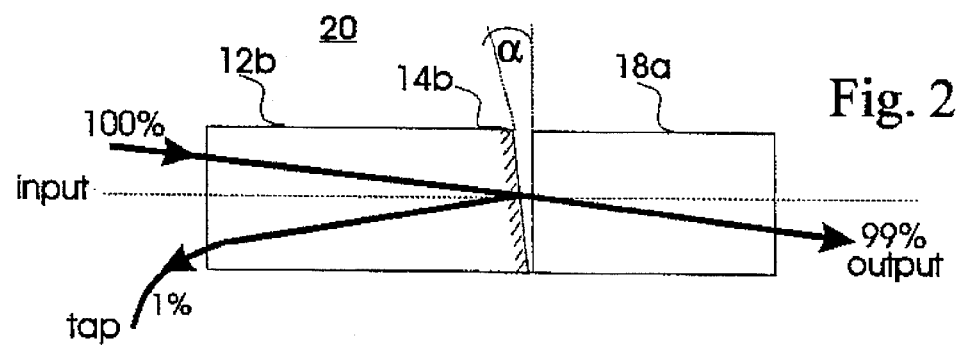
FIG. 2 is a side view of a first embodiment of an optical coupling device in accordance with the invention.
Figure 3:
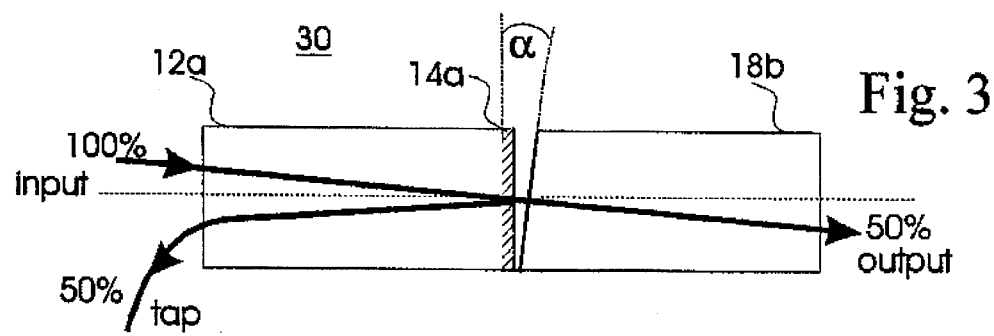
FIG. 3 is a side view of an alternative embodiment of the device shown in FIG. 2.

In a first embodiment of this invention, this undesirable effect can be lessened by ensuring that the planar inwardly facing adjacent endfaces of the two lenses 12a and 18a are non parallel surfaces. In FIG. 2 a device 20 includes a coated GRIN lens 14b having a wedge shaped or slanted endface. Another embodiment resulting in similar effect is shown in the coupler 30 of FIG. 3, where the uncoated lens 18b is has a wedge shaped inward endface. In this embodiment the splitting ratio is selected to be 50:50. By way of example, if the angle α between the planar inwardly facing endfaces of the lenses 12a and 18a is approximately 1.0 degree and preferably greater than 0.3 degrees, the unwanted reflecting standing wave reflects and propagates along a path that is not parallel to the path of the 1% tap signal light. By skewing the two paths in this manner, or offsetting them in a non parallel relationship, the unwanted reflected signal does not combine with the tap light upon exiting the coupler at the optical fiber 15. This is shown in FIG. 4b, where the unwanted signal is misaligned with the optical fiber 15 at the tap port of lens 12a and "walks-off" at an angle from the 1% tap signal.

Of course various other embodiments can be envisaged such as having both of the inwardly facing endfaces of the GRIN lenses slightly wedged such that the endfaces form a non zero angle α. The angleα selected depends upon the desired offset between the reflecting tap signal and the reflection light. Essentially as magnitude the tap signal is made smaller by selecting a particular AR coating, a larger offset angle α is required.

In the preferred embodiment of this invention the GRIN lenses 12a and 18a are coaxial and have a common optical axis. However, the lenses can be arranged such that their optical axes are optically aligned but do not have a common optical axis.

In other embodiments, the wavelength independent coating described heretofore, can be replaced with a wavelength dependent coating, for providing a substantially ripple free WDM device.

Turning now to FIG. 6, an optical coupler is shown having a wedge shaped optical filter 26 disposed between first and second lenses 12a and 18a respectively. The angles of the slanted surface preferably are greater than 0.35 degrees in this embodiment. The slanted surface of the wedge lessens the effect of unwanted etalon interference that naturally occurs within an optical cavity having parallel reflecting surfaces. FIG. 7 shows a similar embodiment having discrete optical components. Discrete lenses 24a, 24b, and 24c are arranged having a wedge shaped optical element in the form of a filter disposed therebetween. In FIG. 8 a two port coupler is shown having a wedge shaped optical element 27 disposed between a pair of lenses 24a and 24c. It should be understood that optical element may be an attenuator, a splitter, a WDM filter, a bandpass filter or other form of optical element.

Figure 9:
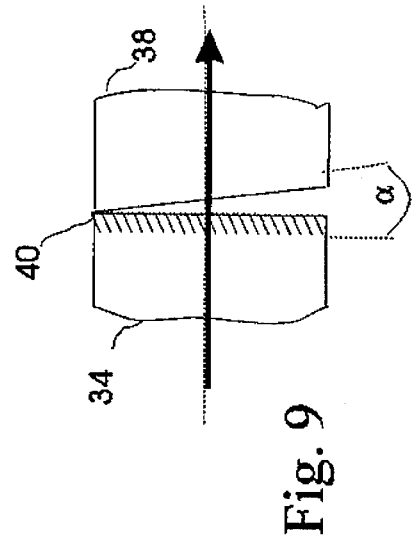

In yet another embodiment of this invention a device for transmitting an optical beam from one port to another is shown in FIG. 9 including a pair of lenses 34 and 38; the first lens 34 is preferably a GRIN lens having an input port at one end as is shown; a collimating other end is coated with a transmissive coating 40 to provide a device having an in-line filter. The second GRIN lens 38 is slanted at an angle of 0.35 degrees or more to lessen the effect of unwanted etalon interference.

Of course, numerous other embodiments can be envisaged without departing from the spirit and scope of this invention.

What is claimed is:

1. An apparatus for splitting an optical beam into at least two beams propagating along different optical paths or for combining a plurality of beams to a single beam, comprising:

a first graded index lens having a first and other end, the first end having at least an input port and a port for receiving a reflected signal;

a second graded index lens having a second end and an other end, the second end having a port for receiving light, the port being optically coupled to one of the ports on the first end, the other end of the first lens and the other end of the second lens being non-parallel surfaces inwardly facing toward one another such that at least one of the inwardly facing non-parallel surfaces is slanted, the first and second graded index lenses being substantially coaxial having a common optical axis and having substantially equivalent profiles, wherein the inwardly facing endfaces faces of the first and second lenses form an angle of at least about 0.35 degrees; and an at least partially reflective material coated on one of the other ends of the first and second lenses.

2. An apparatus defined in claim 1, wherein the coating is a wavelength independent coating.

3. An apparatus as defined in claim 1, wherein the coating is a wavelength dependent coating.

4. An apparatus for transmitting an optical beam from one port to another, comprising:

a first collimating lens having an input end and a collimating output end, the input end having a port for launching the optical beam;

a second lens having a focusing end and a collimating end, the focusing end having an port optically aligned to receive the optical beam of light from the input port, the collimating ends of the first and second lenses being non-parallel surfaces, inwardly facing toward one another and forming an angle of at least 0.35 degrees; and, an at least partially transmissive coating disposed on at least one of the collimating ends of the first and second lenses.

5. An apparatus as defined in claim 4 wherein the at least partially transmissive coating material disposed on one of the collimating ends of the first and second lenses is a filter.

6. An apparatus for transmitting an optical beam from one port to another, comprising:

a first lens having a first and other end, the first end having at least an input port;

a second lens having an second end and an other end, the second end having a port optically aligned with the input port;

a wedge shaped optical element disposed between the first and second lenses having at least one inclined face inclined at an angle of at least 0.35 degrees facing at least one of the other end of the first lens and the other end of the second lens, the inclined face and at least one of the other end faces of the first lens and the second lens being non-parallel surfaces.

7. An apparatus as defined in claim 6 wherein the first and second lenses are graded index lenses.

8. An apparatus as defined in claim 6 having a third port at the first end of the first lens for receiving light from the input port.

* * * * *